United States Patent [19]
Camacho et al.

[11] Patent Number: 6,112,855
[45] Date of Patent: Sep. 5, 2000

[54] APPARATUS AND METHOD FOR CLEANING AN AUTOMOTIVE AUTOMATIC TRANSMISSION

[75] Inventors: Michael Camacho, Rancho Cucamonga; Dale Johnson, Burbank; Mark Sasaki, Riverside, all of Calif.

[73] Assignee: Wynn Oil Co., Azusa, Calif.

[21] Appl. No.: 09/089,024

[22] Filed: Jun. 2, 1998

[51] Int. Cl.[7] .................................................. F16C 3/14
[52] U.S. Cl. ....................... 184/1.5; 184/105.3; 285/12; 285/81; 285/308
[58] Field of Search ................... 184/1.5, 105.3; 285/12, 305, 308, 81, 84

[56] References Cited

U.S. PATENT DOCUMENTS

| | | | |
|---|---|---|---|
| 4,436,125 | 3/1984 | Blenkush | 141/330 |
| 5,033,777 | 7/1991 | Blenkush | 285/317 |
| 5,165,727 | 11/1992 | Valley | 285/12 |
| 5,375,887 | 12/1994 | Johnson | 285/12 |
| 5,403,042 | 4/1995 | Negron | 285/12 |
| 5,447,184 | 9/1995 | Betancourt | 184/1.5 |
| 5,546,999 | 8/1996 | Parker | 184/1.5 |
| 5,845,943 | 12/1998 | Ramacier, Jr. et al. | 285/12 |

*Primary Examiner*—David M. Fenstermacher
*Attorney, Agent, or Firm*—Terry L. Miller

[57] ABSTRACT

A machine and method for cleaning an automotive automatic transmission by effecting the discharge of old used fluid from the transmission and the simultaneous replacement of this old fluid with new fluid on an exchange basis. The machine includes a set of primary hoses, a set of intermediate hoses, and a set of plural pairs of complementary adapter fittings which in combination adapt the machine for convenient service of a wide variety of automobiles and their transmissions. The primary hoses, intermediate hoses, and adapters are configured to fit together in a wide variety of different ways. This variability or flexibility of connection for the machine allows a very limited number of primary hoses, intermediate hoses, and adapters to interface the machine flexibly with a wide variety of different transmissions, and the different vehicles in which these transmissions are installed; all in accord with possibly differing preferences of particular service technicians who use the machine.

20 Claims, 8 Drawing Sheets

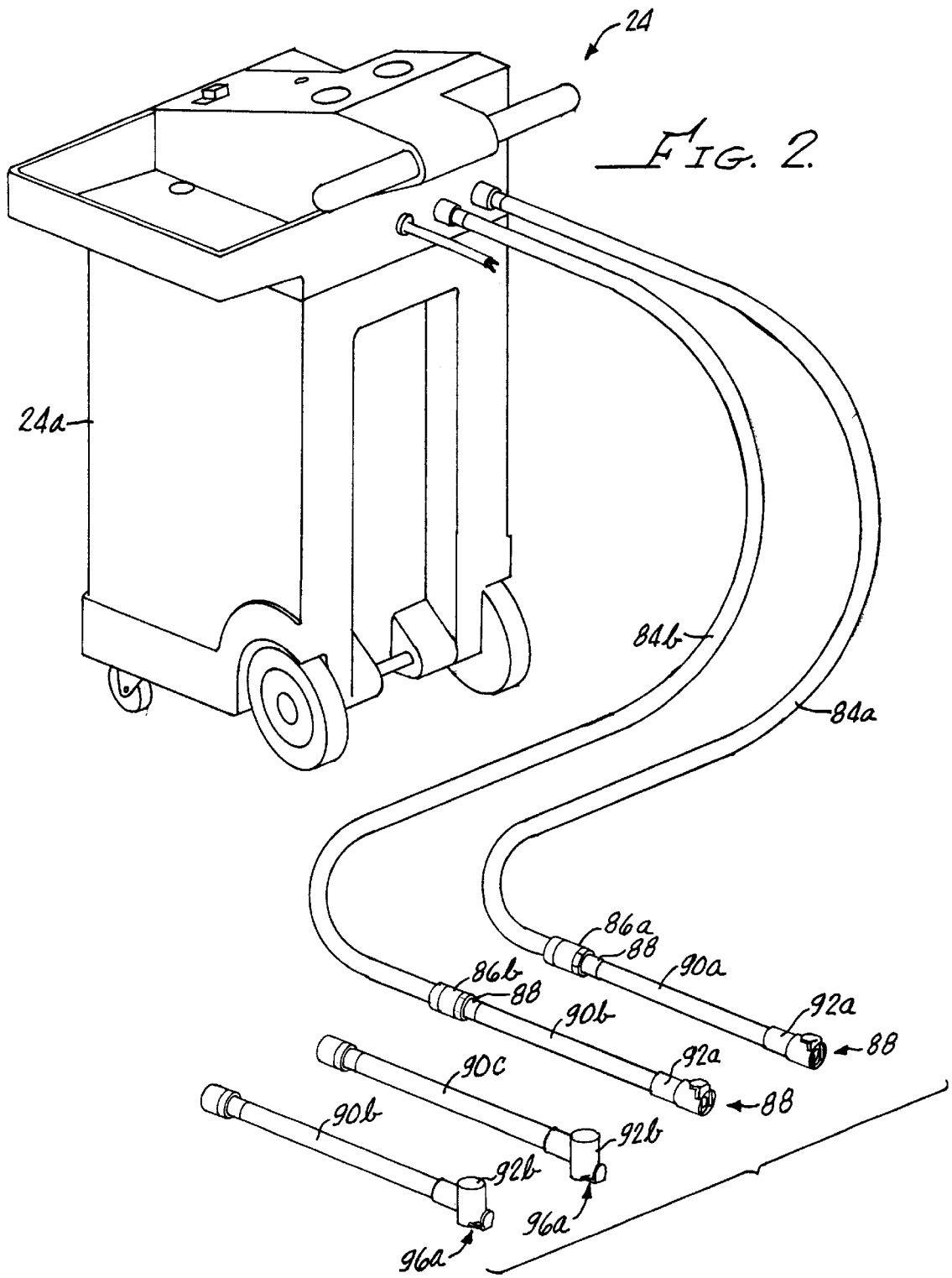

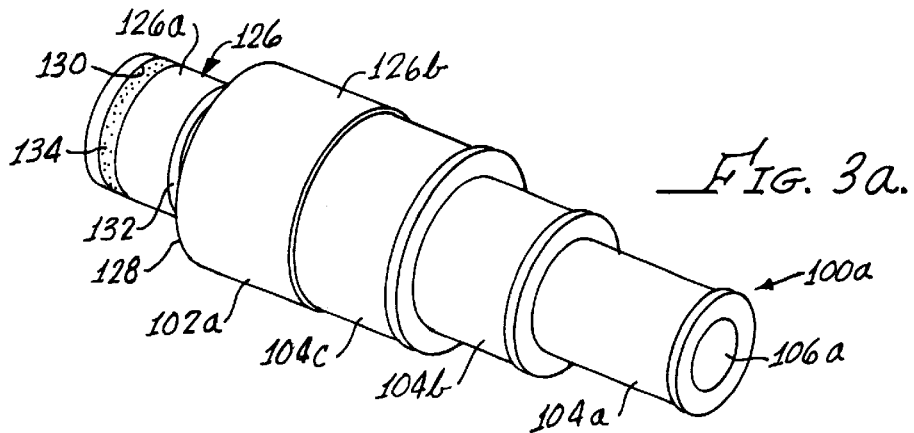
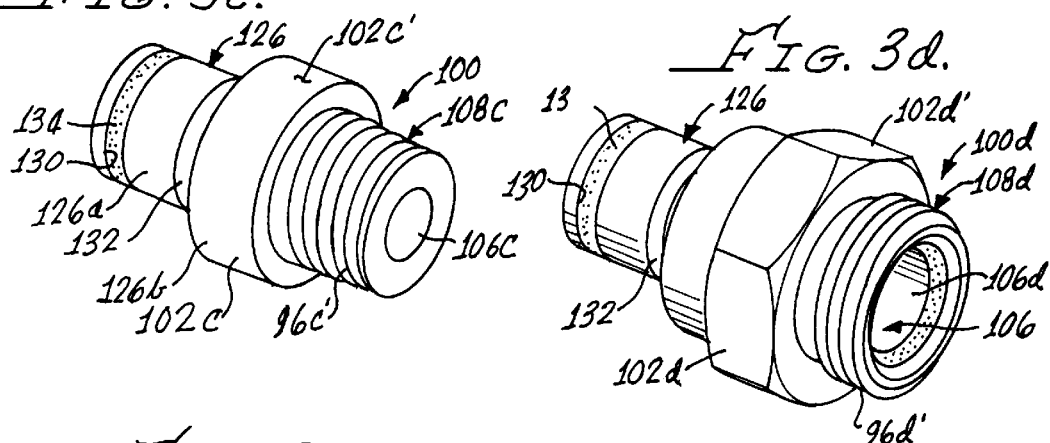
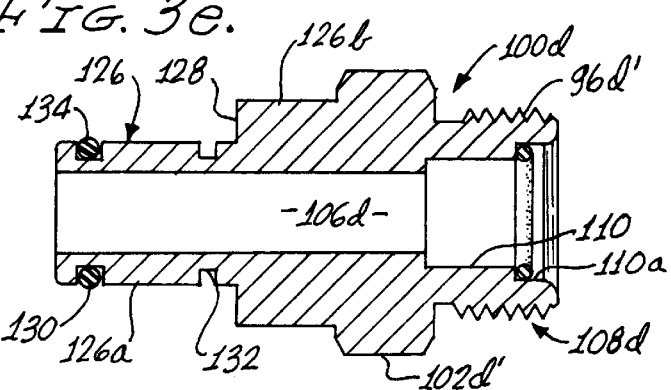

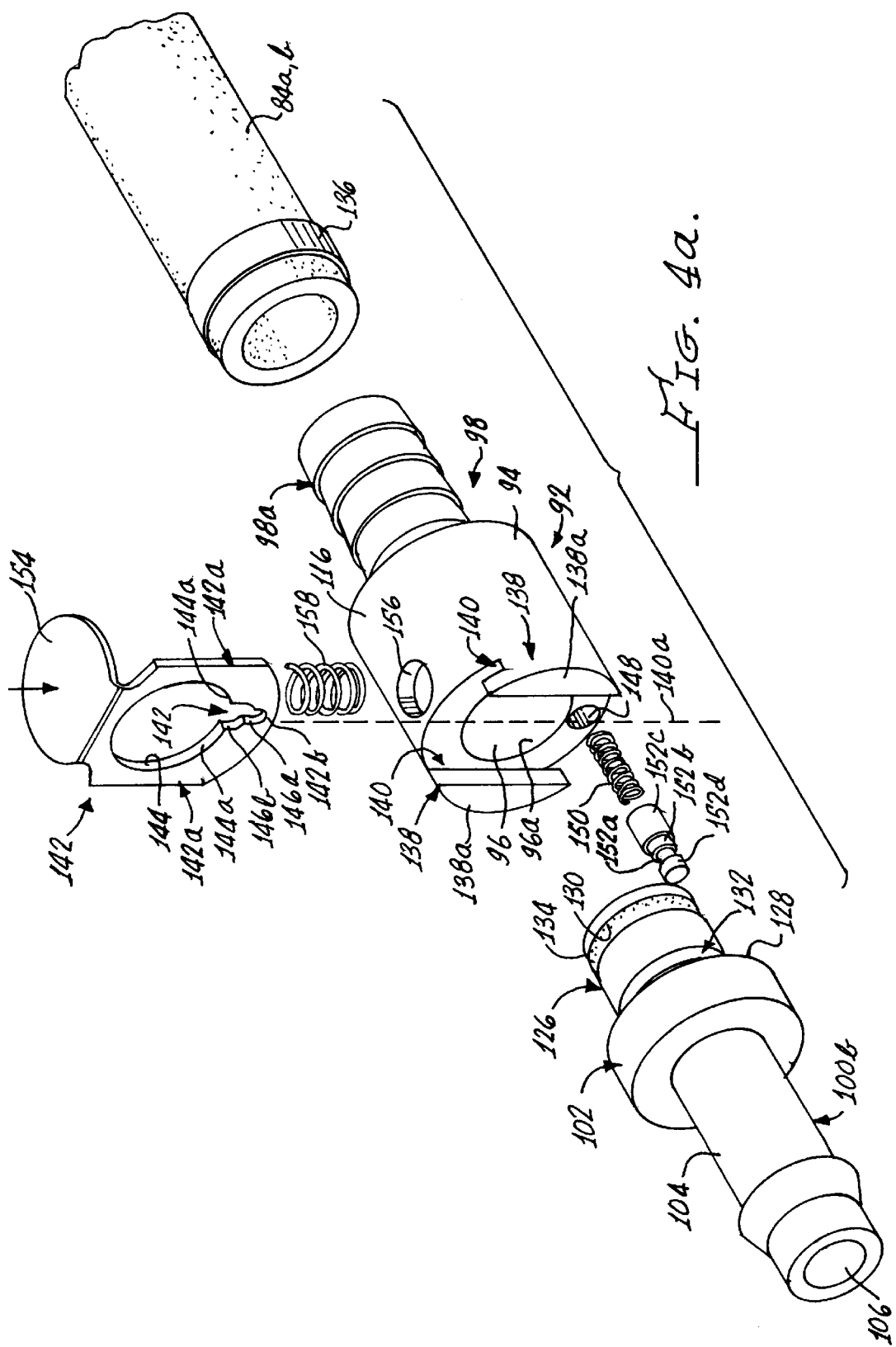

APPARATUS AND METHOD FOR CLEANING AN AUTOMOTIVE AUTOMATIC TRANSMISSION

BACKGROUND OF THE INVENTION

1. Field of the Invention

The present invention is in the field of apparatus and methods used to clean foreign material, varnish, oxidation products, metallic wear particles, and other environmental and operating residues from an automotive automatic transmission. More particularly, the present invention relates to a machine for connection in a relation of fluid flow recirculation or exchange with an automotive automatic transmission, and which provides for circulation of a cleaning fluid through the transmission, as well as for replacement of the used transmission fluid from the transmission with new fluid which is provided from a reservoir associated with machine. The machine includes a set of especially configured hoses each of which are fitted at their opposite ends with quick-disconnect couplings. One of the quick-disconnect couplings is configured to interface with the fluid exchange machine, and the other is configured to interface with any one of a variety of adapter fittings which are provided in a set. The set of fittings includes pairs of complementary adapter fittings. The pairs of adapter fittings of the set each include differently configured and complementary end fittings which on the one hand connect with the quick-disconnect couplings on the hoses and on the other hand also connect with various ones of the wide variety of fittings and connections used in various automotive vehicles and the wide variety of automotive automatic transmissions of these vehicles.

2. Related Technology

A conventional cleaning machine for an automotive automatic transmission is known according to U.S. Pat. No. 5,337,708, issued Aug. 16, 1994 to We-Yu Chen. The '708 patent is believed to teach a transmission fluid change machine in which an external ATF circulation loop is opened, with part of the machine completing this loop in one mode of operation. The used transmission fluid, possibly with a transmission flushing solution, is circulated in the external circulation loop as completed by the machine. When operated in an exchange/refill mode, the machine receives old transmission fluid and supplies new fluid at a selected pressure or volume delivery rate. The machine is intended to be operated from the 12 volt power supply of the automobile or other automotive vehicle being serviced. The new transmission fluid tank of this device appears to be provided with a level sensor, so that the system can be reverted to loop configuration (filtration/flushing) should the level of new ATF drop too low. A pump is utilized to move new ATF from the fluid tank to the transmission being serviced. However, it is not clear from this patent that in the event the power supply to this device is interrupted or the pump ceases to operate, how the configuration of the device is reverted to loop form so that the transmission of the vehicle being serviced is not damaged by being operated with insufficient ATF. Although this patent asserts that a power failure will cause reversion of the apparatus to loop configuration in the event of a power failure, how this change in configuration is to be effected or powered is not set out.

Another conventional transmission fluid change apparatus is disclosed by U.S. Pat. No. 5,318,080, issued Jun. 7, 1994 to James P. Viken. The '080 patent is believed to disclose an apparatus in which supply of the new ATF is provided by a pressurized storage container, which is pressurized by the used ATF withdrawn from the transmission. The storage container has a chamber which is separated into two sub-chambers expanding and contracting in opposition by a flexible wall. As used ATF from the transmission is received into one sub-chamber, new ATF is displaced from the other sub-chamber to the transmission. This device has the limitation that the volume of new transmission fluid supplied to the transmission can not easily exceed the volume of old fluid removed from the transmission. This may be a disadvantage because flushing of contaminated old fluid from the transmission may require infusion of more than an equal volume of new transmission fluid.

Yet another conventional transmission service machine is known according to U.S. Pat. No. 5,370,160, issued Dec. 6, 1994 to Zachary T. Parker. The '160 patent is believed to disclose a service machine in which the external ATF fluid return loop for the transmission is completed by a reservoir from which the fluid is drawn by a pump. Accordingly, in the event that operation of the pump is interrupted while the serviced vehicle continues to operate, the transmission of the vehicle is at risk of damage from dry running. A separate pump is used to supply new ATF to the transmission, but this pump may suffer from the same power supply interruption, so that the transmission is still at risk of damage from dry running. The Parker '160 patent does not appear to provide a closed external ATF circulation loop for the transmission being serviced (other than the one relying on operation of a pump), and does not use a three-way valve to complete or open such an external ATF circulation loop.

Still another conventional apparatus for exchanging the fluid of an automatic transmission is known in accord with U.S. Pat. No. 5,447,184, issued Sep. 5, 1995 to Eduardo Betancourt. The '184 patent is believed to disclose an apparatus in which a reservoir for new ATF is provided so that the volume of new fluid supplied to the transmission can exceed the withdrawn volume. The '184 patent appears to include a sensor operating a bell to bring the attendant's attention to the fact that the supply of new ATF is at risk of running out. However, if the attendant is not close at hand or is inattentive, the transmission may still be damaged if the supply of new ATF runs out while the transmission is being flushed. Still further, the device taught by the '184 is not believed to provide any safeguard to protect the automatic transmission in the event of a power failure to the apparatus while the transmission is being flushed during operation.

Finally, another conventional automatic transmission flush apparatus is known according to U.S. Pat. No. 5,472,064, issued Dec. 5, 1995. The feature which the '064 patent appears to contribute to the art is the use of a conventional directional flow control valve. This flow control valve allows connection of the apparatus to the external ATF circulation loop (i.e., the ATF cooler loop) of the transmission with no need to take note of the direction of fluid circulation in this loop. If the internal fluid flow direction of the apparatus happens to be correct, there is no need to change the valve position. In the event the internal fluid flow direction of the apparatus is incorrect, then reversing the position of the flow control direction valve will match the internal flow direction to the direction of the fluid flow in the external ATF flow loop of the transmission.

A persistent problem and disadvantage with all of the conventional machines noted above for service of an automotive automatic transmission, as well as with other conventional machines for this purpose, is that the machines each require a great number of hoses, fittings, and adapters in order to interface in fluid recirculation and exchange relationship with the wide variety of different automotive automatic transmissions, and the vehicles in which these transmissions are installed. That is, automotive automatic transmissions generally have a transmission fluid cooler, which in some cases is configured as a liquid-to-air heat exchanger mounted near the vehicle's radiator, and in other cases is configured as a liquid-to-liquid heat exchanger (i.e., transferring heat from the transmission fluid to engine coolant, which is then cooled in the "radiator" (which itself is a liquid-to-air heat exchanger). In many cases, the fittings and adapters are configured as end termination structures which are permanently attached to lengths of hose, sometimes including sections of rigid metal tubing permanently attached to lengths of hose, and to which an end termination fitting or coupling is permanently secured.

Accordingly, a wide variety of differing sets of hoses, adapters, couplings, and fittings have been provided for use with these machines. Depending upon the variety of such fittings, couplings, and adapters, various ones of the conventional machines may or may not be able to service the automatic transmissions of particular automotive vehicles. That is, the proper set a couplings, adapters, and fittings may not be available for some vehicles. Further, the variety of hoses, adapters, couplings and fittings, has necessitated the provision of a considerable storage space for all this equipment. And service technicians must study instructions for all these couplings, fittings, hoses, and adapters, or simply figure out an arrangement on their own, in order to service the transmission of various vehicles. Dependent upon the ingenuity of particular service technicians, a convenient or more difficult interconnection with a particular vehicle may be accomplished.

In other words, conventionally, this large number of hoses, fittings, couplings and adapters that are encountered in servicing of automotive vehicles has been considered necessary in order to interface with the great variety of differing transmission installations and connections provided by the large number of differing vehicles encountered in a contemporary automotive service environment. A disadvantage of the large number of hoses in addition to the storage space required for these in a service area, is the necessity for a service technician to deal with a long and heavy piece of hose while making the interconnections of this hose to a vehicle being serviced. After the hose is interconnected with a vehicle to be serviced, then the hose is connected to a service machine, and the service procedure can begin. However, access in many modern cars and other vehicles to the transmission fluid cooler loop is not easy. Having to deal with this commonly restricted access and to also manipulate a cumbersome length of hose while making the connections is not an easy task.

Further, in addition to representing a considerable investment in hardware, some of which is only rarely used, this large number of hoses, fittings, and adapters disadvantageously requires a considerable storage space in, adjacent to, or accessible conveniently close to a transmission service machine. Also, because of the large number of hoses, adapters, and fittings, there also is presented the possibility that the service technician who uses the machine will use an incorrect fitting or adapter, possibly resulting in leakage of transmission fluid. Further, the great number of hoses, fittings, and adapters required by conventional transmission service machines provides an abundant opportunity for the service technician to lose or misplace a hose or fitting, so that some vehicles can not be serviced until a replacement is obtained.

In view of the above, it would be desirable to provide a machine and method to service an automotive automatic transmission which machine and method requires a greatly reduced number of hoses, adapters, and fittings in comparison to conventional machines of this type in order to interface with the transmissions of the most commonly encountered automotive vehicles in the contemporary service environment.

SUMMARY OF THE INVENTION

In view of the above, it would be an advantage, and is an object of the present invention, to provide a machine and method for cleaning a variety of different automotive automatic transmissions which avoids one or more of the deficiencies of the conventional related technology.

An additional object of this invention is to provide a machine and method for cleaning a variety of different automotive automatic transmissions which requires a greatly reduced number of hoses, adapters, and fittings to interface the machine in fluid recirculation and exchange relationship with the commonly encountered variety of transmissions.

Yet another object for this invention is to provide an automotive transmission service machine which includes a pair of hoses respectively for conducting transmission fluid from a transmission to the machine, and from the machine back to the transmission; along with a set of adapters and fittings interfacing with these hoses to adapt the one pair of hoses to a wide variety of automotive vehicles and the transmissions of these vehicles, so that the fluid recirculation and exchange relationship of the machine with the automotive transmission is effected via a pair of hoses, interfaced with appropriate fittings and adapters.

Accordingly, the present invention according to one aspect provides a machine for service of an automotive automatic transmission, which transmission has an external fluid circulation loop, said machine being effective for use in interrupting said external fluid flow loop at a coupling therein and to effect exchange of used transmission fluid from the transmission with new fluid from a supply thereof, said machine comprising: a first fluid flow conduit for conducting used transmission fluid from the transmission to a waste container, and a second fluid flow conduit for conducting new transmission fluid from a source thereof into the transmission; a pair of elongate primary hoses, each one of said pair of primary hoses defining a respective portion of one of said first conduit and of said second conduit, each one of said pair of primary hoses including at a distal end thereof a respective one of a pair of substantially identical first quick-disconnect coupling portions; an intermediate pair of hoses each one including at a proximal end thereof a respective one of a pair of substantially identical second quick-disconnect coupling portions complementary to said first quick-disconnect coupling portions, and at a distal end thereof each one of said another elongate pair of hoses having a respective one of pair of substantially identical additional quick-disconnect coupling portions; and a pair of adapters each one having a substantially identical first end portion complementary to and sealingly engageable with one of said pair of additional quick-disconnect coupling portions, and a second end portion providing a termination feature complementary to said coupling of said external fluid circulation loop; whereby said pair of adapters form a fluid flow connection between said external fluid circulation loop of said transmission and said first conduit and said second conduit.

According to another aspect, the present invention provides a set of adapters for use with a machine for changing fluid in an automotive automatic transmission on an exchange basis for new fluid, the set of adapters including plural pairs of adapters each pair of which is complementary at one end to one another and to a particular coupling on an automotive vehicle, the pairs of adapters each also including a second end all of which are substantially identical to one another.

A better understanding of the present invention will be obtained from the following description of a single exemplary preferred embodiment of the present invention taken in conjunction with the appended drawing Figures, in which the same reference numeral is used though out the several views to indicate the same feature, or features which are analogous in structure or function. It will be understood that the appended drawing Figures and description here following relate only to one exemplary preferred embodiment of the invention, and as such, are not to be taken as implying a limitation on the invention. No such limitation on the invention is implied, and none is to be inferred.

BRIEF DESCRIPTION OF THE DRAWING FIGURES

FIG. 1 provides a schematic depiction of an automotive automatic transmission in combination with an engine, a transmission fluid cooler, and a machine according to the present invention;

FIG. 2 provides a perspective view of a machine which physically embodies the present invention, and which includes a set of four hoses (three of which are fragmentarily depicted) each of a different configuration, and which are used two at a time to interconnect the machine with an automatic transmission in a vehicle.

FIGS. 3a through 3m provide illustrations of an exemplary set of adapters including fittings for interface on the one hand with any one of the set of hoses seen in FIG. 2, and on the other hand adapting the hoses for interface in fluid flow connection with a variety of automotive automatic transmissions, thus to interface a physical implementation of the machine schematically depicted in FIG. 1 (and as seen in FIG. 2) to an automotive automatic transmission;

FIG. 4a and FIGS. 4b–4e respectively provide an exploded perspective view and fragmentary cross sectional views of a coupling structure making up part of each one of the conduits seen in FIG. 2, and which can interconnect a part of any one of the adapters seen in FIG. 3;

FIG. 5 provides a fragmentary pictorial illustration of an exemplary example of an actual connection of the machine of FIGS. 1 and 2 to an automotive automatic transmission in an exemplary vehicle using two of the set of four hoses seen in FIG. 2, and a selected pair of adapters from the set illustrated in FIG. 3.

DETAILED DESCRIPTION OF AN EXEMPLARY PREFERRED EMBODIMENT OF THE INVENTION

An overview

Figure 1:
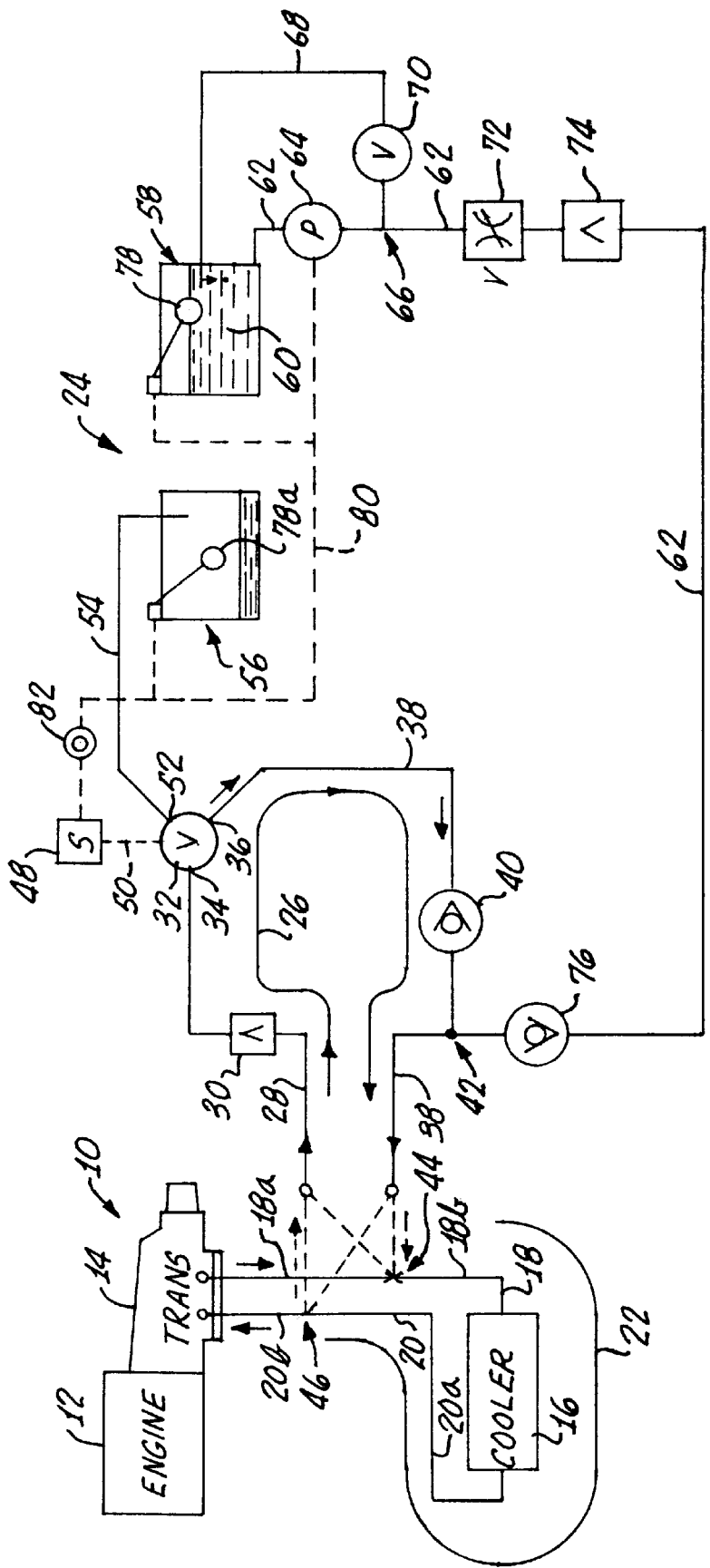

Referring to the appended drawing Figures, with attention first to FIG. 1, the numeral 10 indicates an automotive power train including an engine 12, an automatic transmission 14 driven by the engine 12, and a transmission fluid cooler 16. The power train 10 is disposed in an automotive vehicle, generally indicated with numeral 10a. It is to be understood that the vehicle 10a may be an automobile, truck, bus, or other type of automotive vehicle having an automatic transmission. The rest of the power train 10 may include, for example, a drive shaft or axle shafts and driving road wheels, all of which will be so well understood by those ordinarily skilled in the pertinent arts that it is not illustrated in FIG. 1. The transmission fluid cooler 16 may be associated with a coolant radiator (not shown) of the engine 12 (i.e., a liquid-to-liquid type of cooler or heat exchanger) or may be a separate liquid-to-air cooler (i.e., heat exchanger). In high performance, heavy-duty, or tow-vehicle installations, the transmission 14 may be provided with both a radiator-associated transmission cooler (liquid-to-liquid) and also with a separate air-cooled (liquid-to-air) transmission cooler. All of these alternative possibilities for the automatic transmission cooler 16 (and others) are subsumed in the generic cooler indicated with the numeral 16.

In each case, the automatic transmission 14 is connected to the transmission cooler 16 by a hot-side supply conduit 18. During operation of the engine 12, an internal pump (not shown) of the automatic transmission 14 provides pressurized transmission fluid via the conduit 18 to the cooler 16. This transmission fluid will have been heated by operation of the transmission 14. A cool-side return conduit 20 returns transmission fluid from the cooler 16 to the transmission 14. Accordingly, it is seen that a first external transmission fluid circulation loop (indicated with the numeral 22) is cooperatively defined by the supply conduit 18, cooler 16, and return conduit 20.

In order to connect a transmission cleaner machine (which is generally indicated with the numeral 24) to the transmission 14, the first loop 22 is interrupted (as will be described), and is expanded to include an additional second fluid flow loop (indicated with numeral 26) defined within the machine 24. The loop 26 of machine 24 includes an intake conduit 28 in which a fluid flow meter 30 is interposed. Conduit 28 connects to a three-way valve 32 at a first (input) port 34. From a second port 36 of valve 32 a conduit 38 extends back to the power train 10, and has a check valve 40 and T-connection 42 interposed therein. As will be explained, the three-way valve 32 is biased to a fail-safe position in which port 34 is connected only to port 36, so that conduit 28 is connected only to conduit 38 and the loop 26 is completed for fail-safe operation of the transmission 14. By "fail safe" is meant that damage to the transmission of a vehicle cannot occur because of running of the vehicle engine while the transmission has insufficient fluid, even if the vehicle being serviced is allowed to run after electrical power supply to the machine 24 has been interrupted, or the machine has been allowed to run out of new transmission fluid, as will be seen.

As mentioned, the connection of the loop 26 into the loop 22 (expanding the latter) will require that either or both of the conduits 18 and 20 is opened somewhere along its length, or is disconnected either at its connection to the transmission 14 or at the cooler 16. In the event that only conduit 18 is opened, as is indicated at the "X" marked with the numeral 44, then the upstream part (18a) of conduit 18 is connected to conduit 28, as is indicated by one dashed line. The return conduit 38 is then connected to the downstream part (18b) of conduit 18, as is indicated by one of the dashed lines. In the event that only conduit 20 is opened, as is indicated at the "X" marked with the numeral 46, then the upstream part (20a) of conduit 20 is connected to conduit 28, as is indicated by one dashed line. The return conduit 38 is then connected to the downstream part (20b) of conduit 20, as is indicated by one of the dashed lines. If the decision by a service technician is made to interrupt both conduits 18 and 20, then the cooler 16 will be temporarily removed from loop 22. The upstream conduit part 18a is be connected to conduit 28 at "X" 44, and the return conduit 38 is connected to return conduit part 20b at "X" 46.

In any of these cases described immediately above, and dependent upon the particulars of the vehicle being serviced and how a service technician decides to connect the machine 24 in order to service the transmission 14 when the engine 12 is operated, the internal pump of the transmission 14 circulates transmission fluid through the loop 26. During this operation, the technician may observe the rate of fluid circulation at the meter 30.

As will be seen, a cleaning material according to the present invention may be added to the transmission 14 in order to facilitate suspension of dirt, contaminants, and wear particles therein. In order to allow removal of used transmission fluid from the transmission 14, which will also carry the suspended dirt, contaminants, and wear particles out of the transmission 14, the machine 24 includes a spring-loaded solenoid 48 which is operatively connected to three-way valve 32 (as is indicated by dashed line 50). When energized, the solenoid 48 shifts the three-way valve 32 so that port 34 is connected only to a port 52. The solenoid 48 is back-driveable by its own spring load when deactivated to return the three-way valve 32 to its first position from the second position of this valve. A conduit 54 extends from port 52 to a waste container 56. During removal of transmission fluid, the technician may observe the rate of fluid flow to the waste container at flow meter 30. It will be noted that when the solenoid 48 is energized, the loop 26 (and therefor, the loop 22 as well) is opened and dumps into waste container 56.

In order to allow removal of used transmission fluid from the transmission 14 to waste container 56 while ensuring that the transmission does not suffer from an insufficient fluid level, the machine 24 includes a supply tank 58 for fresh transmission fluid 60. A conduit 62 extends from near the bottom of tank 58 to the T-connection 42. Interposed in this conduit is a pump 64. Immediately downstream of the pump 64 is located a T-connection 66 to conduit 62, and from which a return conduit 68 extends back to the tank 58. A pressure relief valve 70 is interposed in conduit 68. Downstream of the T-connection 66, a variable flow control valve 72, a flow meter 74, and a check valve 76 are interposed in the conduit 62. The check valve 76 is located adjacent to the T-connection 42.

Operation of pump 64 removes fresh transmission fluid from the tank 58 and delivers this fluid to the transmission 14 via conduit 62, conduit 38, and the part of loop 22 downstream of the "X" connection 44 or 46 in effect. During removal of old transmission fluid and replacement of this fluid with fresh fluid from tank 58, the technician matches the flow rates on flow meters 30 and 74 by manipulation of flow control valve 72.

In order to insure fail-safe operation of the machine 24, a sensor 78 is provided on tank 58 to insure an adequate supply of fresh transmission fluid 60. Sensor 78 is depicted as being of a float-type, but a variety of liquid-level sensors may be used. Sensor 78 is interfaced with solenoid valve 48 and with pump 64 by a safety interlock circuit, indicated by dashed line 80. The safety interlock circuit 80 will not allow solenoid 48 to be energized unless the sensor 78 indicates that an adequate supply of fresh transmission fluid is present in tank 58, and pump 64 is in operation. When these conditions exist, the service technician may initiate transmission fluid withdrawal and replacement by actuating an input control 82 to the safety interlock circuit 80. The input control 82 may take the form of a push button switch which the technician actuates to begin withdrawal of old transmission fluid into waste container 56 and the replacement of this old fluid with new fluid from supply tank 58.

During such withdrawal and replacement of transmission fluid, should the pump 64 be stopped (i.e., possibly because of an interruption of electrical power supply to pump 64 or to the machine 24), or should the sensor 78 indicate that the level of fresh transmission fluid 60 has dropped too low, then the safety circuit 80 will disable solenoid 48, and the spring-loaded valve 32 will return to the position connecting port 34 only to port 36. Thus, in the event of either a cessation of operation of the machine 24, or of a shortage of fresh transmission fluid 60, the loop 26 is restored, and the transmission can not run out of fluid and be damaged by dry running. A similar sensor 78a may be provided on waste container 56 to prevent the overflowing of this tank in the event the service technician forgets to empty this container for recycling frequently enough. The sensor 78a may optionally be provided as a safety factor to prevent overflow of old transmission fluid, and if it is not employed the fail-safe aspect of the present service machine would remain fully in effect.

An Exemplary Implementation of Machine 24

Viewing now FIG. 2, a machine embodying the present invention (also indicated with the numeral 24 and having a housing 24a within which the machine elements of FIG. 1 are received) is seen. This machine 24 additionally provides two elongate hoses 84a, and 84b, which each include at a distal end thereof a respective female portion 86a, 86b of a quick-disconnect coupling structure. Female coupling portions 86a and 86b are substantially the same. Respective male coupling structure portions 88 of the quick-disconnect coupling structures (i.e., each complementary to and capable of interconnection with either of the female portions 84a and 84b) are disposed at proximal ends of each one of four intermediate hoses 90a, 90b, 90c, and 90d. As can be seen in FIG. 2, these intermediate hoses 90a–d are provided in two pairs, with each pair including two substantially identical intermediate hoses. One pair of the intermediate hoses 90a, and 90b provide at their distal ends a respective straight female quick-disconnect coupling structure, each referenced with the numeral 92a, while the other pair of intermediate hoses 90c and 90d provide a similar female quick-disconnect coupling structure (referenced with the numeral 92b) differing from the structures 92a only in that they have an L-shaped configuration.

Male coupling portions (all generally identified with the numeral 122, as will be seen below), which are complementary to the female quick-disconnect coupling portions 92a and 92b will be seen below to be integrally formed each as part of an individual one of a set of adapters to be further described below. It will be understood that any one of the intermediate hoses 90a–90d can be connected to machine 24 as will be described.

Dependent upon the particulars of access to the conduits 18 and 20 (i.e., to the transmission connections of these conduits, and to the transmission cooler connections of these conduits in a particular vehicle to be serviced) a service technician will select two of the intermediate hoses 90a–d for use in servicing the particular vehicle. Thus, any one of the four intermediate hoses 90a–90d can be connected alternatively and completely interchangeably to either of the connectors 86a and 86b of the machine 24, and can thus be used to define a respective part of either conduit 28 or of conduit 38 (i.e., recalling the alternative connections indicated by dashed lines in FIG. 1). It is seen that in the present machine, a wide variety of interconnection possibilities for connecting the machine to a wide variety of vehicles is provided by the use of only the four intermediate hoses 90a–d, as is illustrated in FIG. 2, along with a variety of adapters presented in FIG. 3 (to be further described below). This flexibility of selection for service of a variety of automobiles with a relative few components for the machine 24 expands the utility of the machine 24 very economically. Further, as will be further seen, the utility of the machine 24 and of intermediate hoses 90a–b is expanded yet again at the point of fluid flow interface with the vehicles to be serviced by the completely interchangeable and complementary pairs of adapters (seen in FIG. 3) which are provided to connect with the wide variety of service and connection fittings on vehicles to be serviced using the machine 24.

Interconnection of Intermediate Hoses 90a–d with Machine 24

Further to the above, it is seen that each of the distal end terminations of intermediate hoses 84a, 84b includes and is defined by a respective female coupling structure, generally indicated with numeral 92a or 92b, as is more particularly seen in FIG. 4a, and recalling FIG. 2. Each coupling structure 92 includes an elongate body 94 of generally tubular configuration providing in the case of couplings 92a a stepped through bore 96 extending through the coupling structure 92 to communicate with a respective end portion of one of the intermediate hoses 84a. In the case of the coupling structures 92b, the body 94 includes a L-shaped passage 96a (indicated by an arrow on FIG. 2) and similarly communicating with a respective one of the intermediate hoses 84b. It will be noted that in FIG. 4a only one end of the through bore 96 is seen. All of the female coupling structures 92 are substantially the same, except as is noted. Thus, in the following description, only the straight coupling structures 92a are described in detail, with the coupling structures 92b being understood to be substantially similar.

Turning to FIG. 4, it is seen that the coupling structure 92 includes a body 94 having an elongate tubular section 98, carrying a hose barb section 98a. In the case of the straight couplings 92a on hoses 84a (i.e., straight or aligned with the hose), tubular section 98 is straight. On the other hand, as is illustrated in FIG. 2, the coupling body 94 of the coupling structures 92b on hoses 84b (i.e., L-shaped or providing a 90° connection relative to the length of the intermediate hoses 84b) are each of elbow shape. In this way, a service technician having the hoses 84a, 84b available will chose the two of these four hoses giving best access to the location chosen on a particular vehicle to be serviced in order to connect with the conduits 18 or 20 of the vehicle (recalling the description above of how the machine 24 interfaces with the fluid flow of a transmission in a vehicle).

Continuing now the consideration of the female coupling structures 92, viewing still FIG. 4a, it is seen that the bore 96 includes a cylindrical section 96a opening on the end of the coupling structure 92, and into which a male coupling portion 126 of a representative one of the adapter members (to be further described below) may be sealingly received in order to facilitate fluid flow connection with the respective hose 84a, 84b. On FIG. 4a, this male coupling portion 126 is illustrated along with an adapter (i.e., adapter 100b) seen in FIG. 3b, which is merely representative at this point as an assistance to the reader, and which will be further described below. A further description of the structure and operation of the coupling structure 92 will be given below after a consideration of the wide variety of complementary adapter fittings 100 (the reader will be referred to FIG. 3 for a description of these) which can interchangeably couple with the coupling structures 92.

Providing for Convenient Connection of Machine 24 to a Variety of Vehicles

Viewing now FIG. 3, the details of various ones of a plurality of adapter fittings is illustrated (each generally referenced with the numeral 100 having an alphabetical suffix added) each of which also form a respective male coupling portion 126 for fluid flow interface with the coupling structures 92. As will be seen, the adapters 100 of FIG. 3 are generally provided in complementary counterparts, or complementary pairs, so that when the transmission cooler fittings of a particular vehicle are opened in preparation for servicing the transmission, one adapter 100 fits on and connects to the fitting of the automobile on one side of the opened conduit 18 or 20, and another adapter 100 (usually the other adapter of a complementary pair) fits on and connects to the other fitting of the automobile on the other side of this opened conduit. Further, the adapters 100 are each complementary at one end to a quick-disconnect fitting provided as part of the intermediate hoses 90. In other words, the adapters 100 at one end are complementary of one another and of fittings on a vehicle, and at the opposite end are complementary of the quick-disconnect fittings of the hoses 90 by means of an integral portion of each adapter. Further, the adapters 100 or very compact.

Two adapters which at first blush might be thought to be exceptions to this rule of complementary pairs for the adapters 100 are seen in FIGS. 3a and 3b. These two adapter fittings are intended to be used on automobiles in which the transmission cooler conduits are at least in part defined by flexible hose, and are connected to hose barbs. In servicing this type of installation, the technician will disconnect the hose of the automobile from its hose barb, and use one of the fittings 100a or 100b to connect with this disconnected hose. In order to connect with the exposed hose barb of the automobile, the technician will use another fitting 100a or 100b and a short section of matching hose. Thus, the fittings 100a and 100b are provided in pairs of two identical fittings and are not alone complementary to one another. However, while they are in use to service a vehicle, these fittings 100a and 100b are made complementary by the use of a piece of matching hose.

Continuing this description, in FIG. 3a is seen an adapter 100a having an elongate straight tubular body 102a. This tubular body 102a outwardly defines a stepped series of hose barb sections 104a, 104b, and 104c. The body 102a defines a through bore 106a for communicating transmission fluid through the adapter 100a. In the servicing of a vehicle using a hose to connect transmission fluid to or from the cooler 16 (thus forming a portion of conduit 18 or 20), the technician may choose to disconnect this hose and to use of the adapter 100a to interface with the end of the disconnected hose. As described above, another adapter 100a may be connected with the fitting from which the hose of the automobile has been removed.

FIG. 3b shows an adapter 100b which is similar to the adapter 100a, and which also includes a body 102b of elongate tubular configuration. This body 102b defines a through bore 106b, and outwardly defines a single hose barb section 104d of a selected size. The adapter 100b may be provided in a variety of sizes each having a different size of hose barb 104d.

FIGS. 3c, 3d, 3e, and 3f introduce a family of adapters 100c, 100d, and 100f, which each has a respective elongate tubular body 102c, 102d, and 102f. Outwardly, the bodies provide a surface portion (indicated with the numerals 102c', 102d', and 102f') which provides for wrenching of the adapter. In the case of adapter 102c of FIG. 3c, the wrenching surface 102c' is a smooth cylindrical surface, and a pipe wrench is intended to be used on this surface. The bodies 102c–102e each define a through bore (indicated with numeral 106 with the appropriate suffix). Each of these adapters 100c–100f includes a respective integral end termination portion 108c, 108d, and 108f. In the case of adapter 100c, the end termination portion outwardly defines a male pipe thread. Various adapters 100c may be provided with pipe thread portions 108c of various sizes of male pipe thread. Adapter 100d (seen in FIGS. 3d and 3e) includes a termination portion 108d outwardly defining a straight male thread, and inwardly providing a stepped cylindrical bore 110 with a bore portion 110a for sealingly receiving an O-ring sealing member. Those ordinarily skilled in the pertinent arts will recognize that adapter 100d provides for sealing interface with O-ring type male tubular fittings which have a captive nut for threaded engagement with the thread on portion 108d (see, FIG. 3m for an example of this type of fitting as part of one of the complementary adapters of the present invention). Again, various adapters of the type seen in FIGS. 3d and 3e may be provided in a variety of sizes.

Figure 3F:
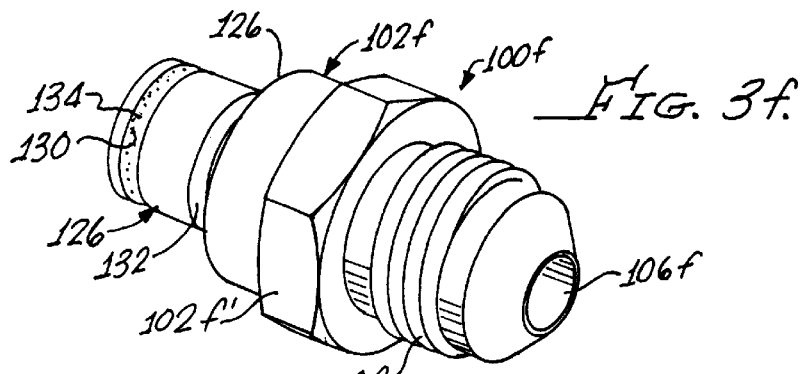

FIG. 3f illustrates an adapter 100f which at end portion 108f is configured as a male flare tube fitting. That is, the adapter 100f at portion 108f will sealingly interface with transmission cooler fittings or with conduits which employ a female flare tube fitting (see, FIG. 3h for an example of this type of fitting as a part of one of the complementary adapter fittings of the present invention). As will be understood, when this type of fitting on a vehicle is opened, one male side and one female side of the opened fittings is presented. As will be seen, the complementary pairs of adapters 100 provide for this eventuality. Again, adapters 100f of various sizes may be provided.

Figure 3G:
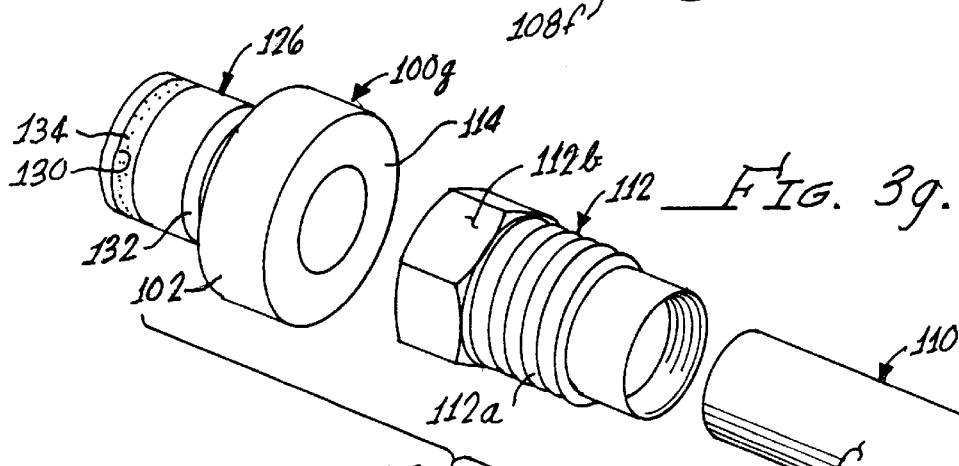

FIG. 3g illustrates one of a family of adapters 100g which may be provided in various sizes as needed. The adapter 100g includes an elongate tubular body 102g having an elongate tubular termination portion 110 which outwardly defines a cylindrical surface 110g. The portion 110 ends in a flare part 110g', and a sleeve member 112 is rotatably carried on portion 110 captured between the flare part 110g' and a shoulder 114 on the body 102. The sleeve member 112 outwardly defines a straight male thread 112a and includes a hexagonal surface portion 112b providing for wrenching of the adapter. This type of fitting will interface with vehicles using flared tube fittings with male seats in the female portions of the fittings (see, FIG. 3j for an example of this type of fitting as a part of one of the complementary adapter fittings of the present invention).

The fitting 100g shown in FIG. 3g is of a 45° flare configuration, but those ordinarily skilled will recognize that other types of flare tube fittings of this design may be provided with flare angles other than 45°. AN type fittings, for example, may use a flare angle that is other than 45°. Thus, an adapter 100g as is shown in FIG. 3g, but with a flare angle other than 45° may be employed as necessitated by the vehicles to be serviced using machine 24.

Figure 3H:
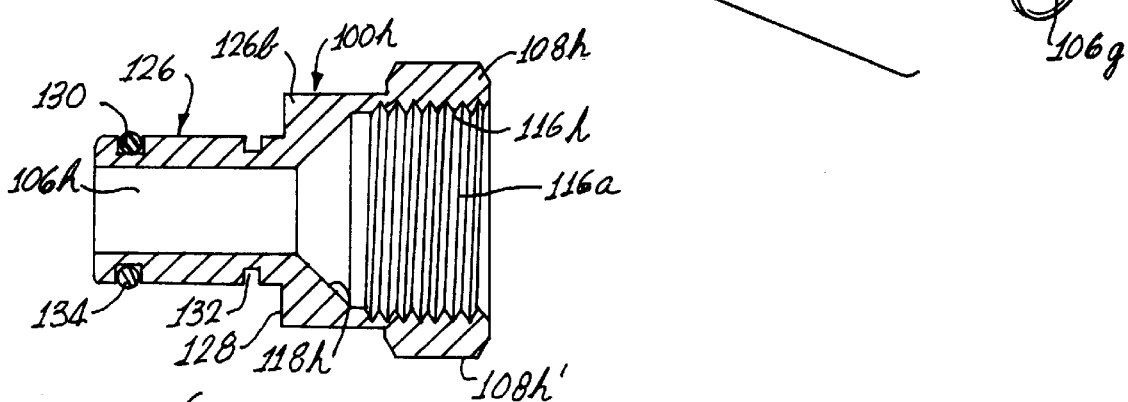
Figure 3I:
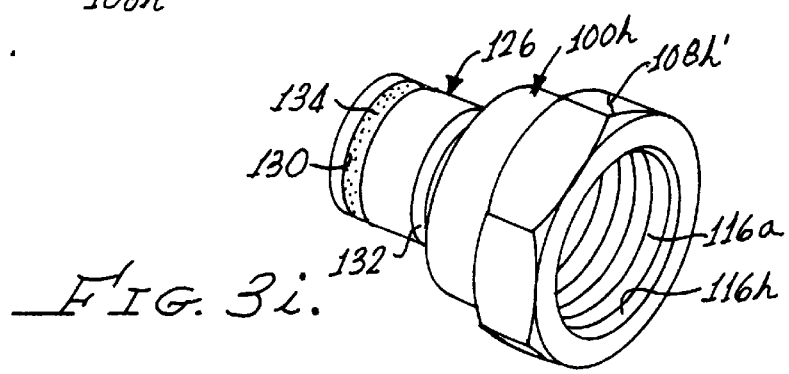

FIGS. 3h through 3k illustrate another family of adapters 100h, 100j, and 100k, which also may be provided in various sizes dependent upon the requirements of vehicles to be serviced with machine 24. FIGS. 3h and 3i depict an adapter 100h which has an integral end termination portion 108h outwardly providing a surface portion 108h' which is configured in a hexagonal shape to allow wrench engagement with the adapter. Inwardly, this adapter 100h provides a bore 116h with straight female thread 116a leading to a female tapered seat 118h (seen in FIG. 3h only). Those ordinarily skilled will recognize that the adapter 100h will interface with a fitting of the type also requiring use of the adapter 100f shown in FIG. 3f. That is, when a vehicle having this type of fittings is serviced, the fittings are opened, and one side connects to an adapter 100f, while the other side connects to an adapter 100h.

Figure 3J:
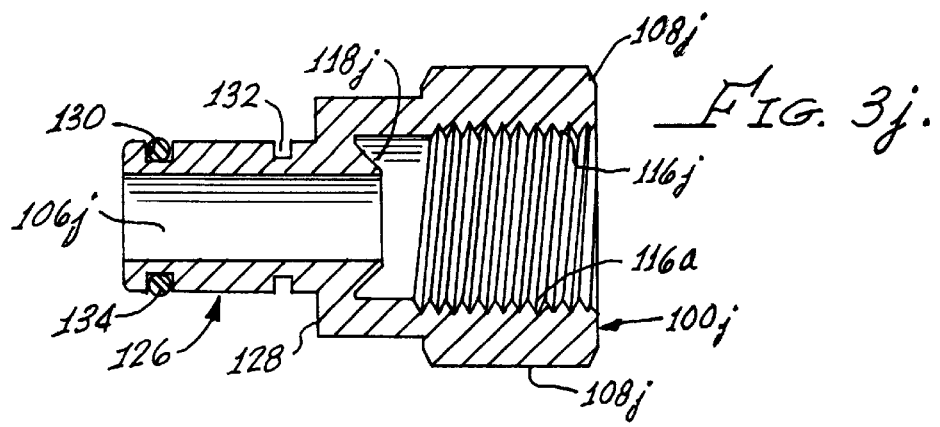

FIG. 3j depicts another adapter of this family, which adapter 100j has an integral end termination portion 108j outwardly providing a hexagonal surface portion 108j', and which inwardly provides a bore 116j with a respective straight female thread 116a. In this case, the thread 116a leads to a male tapered seat 118j. Those ordinarily skilled will recognize that the adapter 100j will interface with a fitting of the type also requiring use of the adapter 100g shown in FIG. 3g.

Figure 3K:
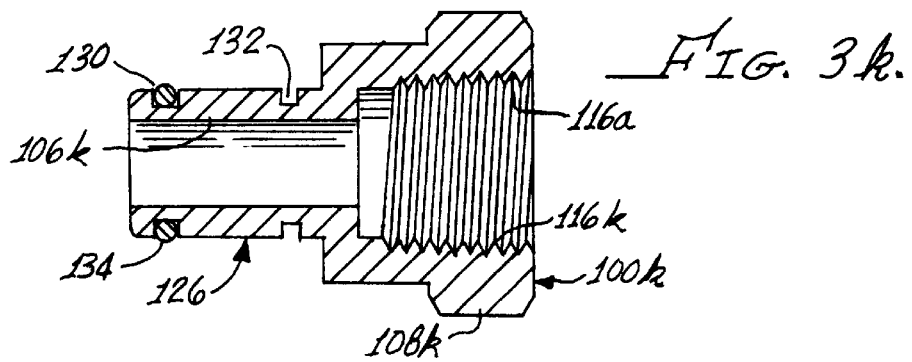

Finally, FIG. 3k shows an adapter of this same family which has a termination portion 108k inwardly providing a respective female pipe thread 116a. This adapter is used as the counterpart or complement to the adapter of FIG. 3c.

Figure 3L:
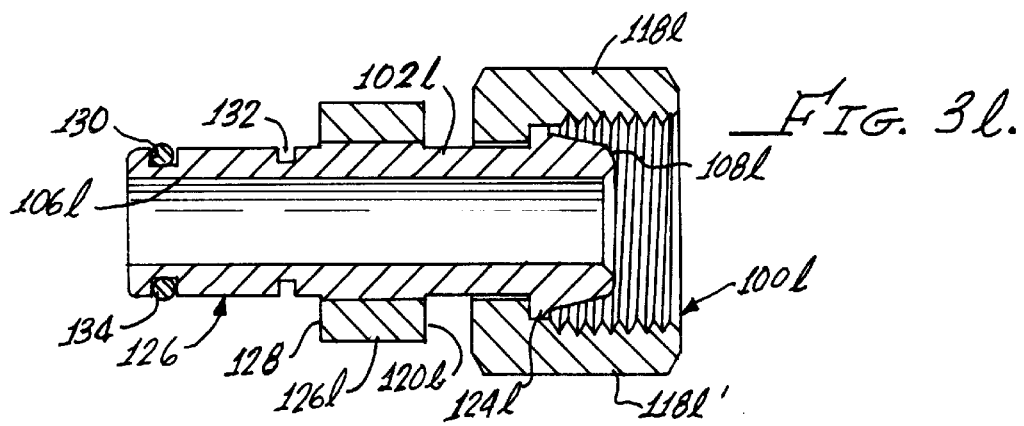
Figure 3M:
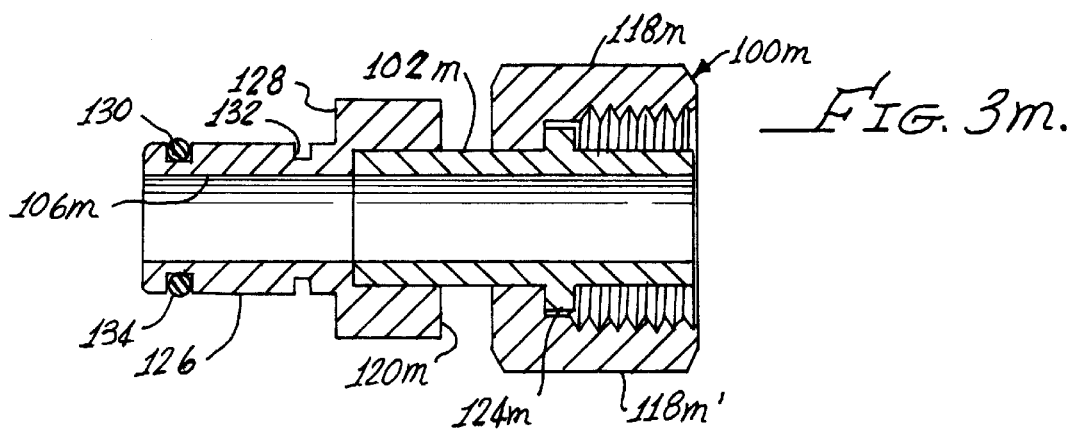

FIGS. 3l and 3m illustrate two additional adapters, which are respectively counterparts of the adapters seen in FIGS. 3g and 3d/e. The adapter of FIG. 3l has an elongate tubular body 102l upon which a nut member 118l is captively retained between a shoulder 120l and a ring part 124l. The nut member 118l has a surface portion 118l' configured hexagonally to allow wrench engagement. Also, the ring part 124l of the body 102l is welded to the reminder of this body so that the nut member 118l is permanently rotationally retained on the adapter 100l. The termination portion 108l of this adapter 100l is configured to interface with a fitting counterpart to the flare tube fitting that is shown in FIG. 3g, although this form of flare tube fitting will use a shorter sleeve member than the one shown in that drawing Figure.

Figure 4B:
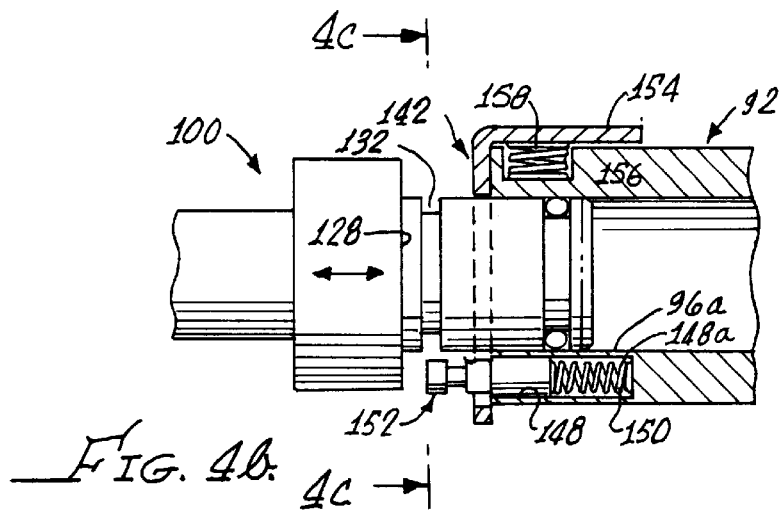
Figure 4C:
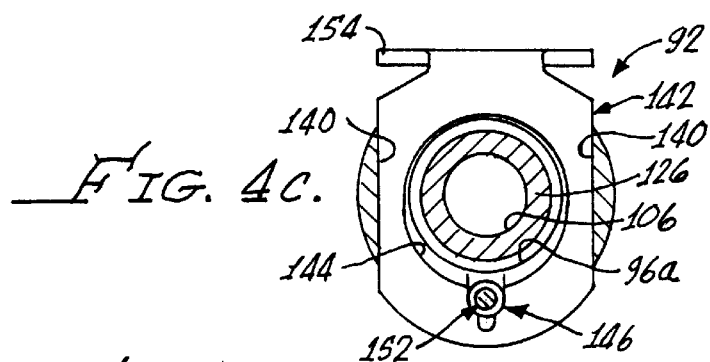
Figure 4D:
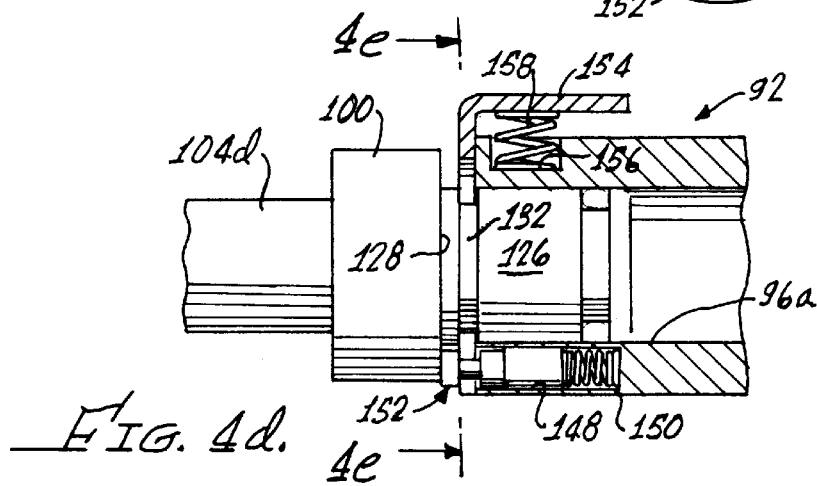
Figure 4E:
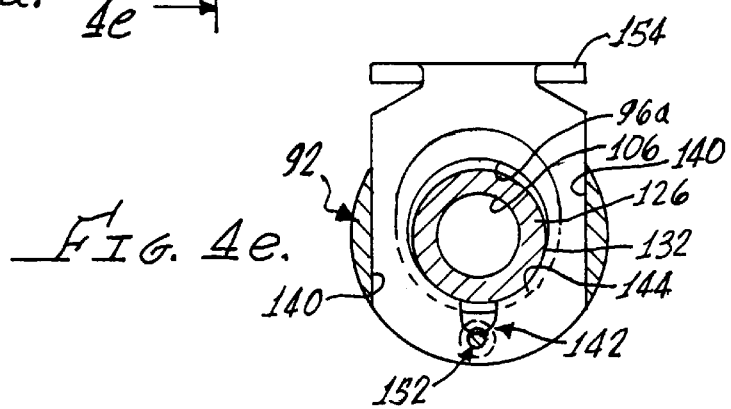

In the case of the adapter 100m shown in FIG. 3m, this adapter is a counterpart of the adapter seen in FIGS. 4d/e. The adapter of FIG. 3m has an elongate tubular body 102m upon which a nut member 118m is Captively retained between a shoulder 120m and a ring part 124m. The nut member 118m has a surface portion 118m' configured hexagonally to allow wrench engagement. Also, the ring part 124m of the body 102l is welded to the reminder of this body so that the nut member 118m is permanently rotationally retained on the adapter 100m. The termination portion 108m of this adapter 100m is configured to provide a shoulder against which an O-ring sealing member seats, and can interface with a fitting counterpart to the O-ring adapter shown in FIGS. 3d/e.

Interconnecting Adapters 100 and Hoses 84a/b

Reviewing FIG. 3, it is seen that each adapter 100 includes a male coupling portion 126 which is stepped with a smaller diameter portion 126a and a larger diameter portion 126b cooperating to provide a shoulder 128, both portions 126a and 126b are tubular and of cylindrical shape. The bore 106 opens centrally on the male coupling portion 126. Along its length, the male coupling portion 126 defines a pair of spaced apart circumferential grooves 130 and 132. Groove 130 closest to the end of portion 126a receives an O-ring 134 while groove 132 adjacent to shoulder 128 remains open.

Returning to a consideration of the couplings 92, one example of how the hoses 84a and 84b may be joined sealingly to their respective coupling structures 92 is seen in FIG. 4a. In this example, each hose is sealingly secured to a respective coupling structure 92 by means of a malleable ring 136 which is swaged to a smaller diameter after the end portion of the respective hose is slipped onto the hose barb section 98a. Those ordinarily skilled in the pertinent arts will understand that other alternatives are available by which the hoses 84a and 84b may be sealingly joined to their respective female coupling structures 92.

At the end of body 94, as is best seen in FIG. 3a, this body includes a pair of axially extending D-shaped bosses, each indicated with the numeral 138. These D-shaped bosses 138 each have a respective flat face 138a, which faces are spaced apart on opposite sides of the opening of bore 96. Each boss 138 also defines a laterally extending groove 140, which is disposed toward the groove of the other of the pair of bosses 138, so that the pair of grooves 140 cooperate to define a laterally extending guide way, the center of which is indicated with a dashed line and numeral 140a. Slidably received in the guide way 140a is an apertured plate-like retainer member 142 having a pair of spaced apart straight and parallel side edge portion 142a, each of which is slidably received in one of the grooves 140. This retainer member 142 defines an aperture 144, which is sized to be slightly larger than the opening of bore 96, and is large enough to pass the male coupling portion 126 of any one of the adapters 100 (recalling the descriptions of FIG. 3).

The aperture 144 is somewhat keyhole shaped, and has a stepped recess 146 about midway between the side edge portion 142a, viewing now FIGS. 4a–4e in conjunction with one another. This recess 146 includes a smaller sized portion 146a leading to a larger sized portion 146b, which communicates with the remainder of the aperture 144. Aligning with the recess 146, the body 94 defines a blind bore 148 spaced from and parallel with bore 96. Received into the bore 148 is a coil compression spring 150, which seats against the blind end wall 148a of the bore 148, and a stepped and headed plunger member 152. Plunger member 152 has a smaller-sized stepped section 152a (best seen in FIG. 4a), which is sized to fit in portion 146a of recess 146. A larger-sized stepped section 152b of the plunger 152 is sized to fit in portion 146b of recess 146. This plunger member 152 also has a body portion 152c and a head portion 152d, both of which are sized to slidably fit into bore 148. Retainer member 142 includes a connecting section 142b aligning with the recess 146, and also includes a thumb-tab 154 aligning with a blind radially extending bore 156. A coil compression spring 158 is received into the bore 156, and seats against the blind end wall 156a of this bore. An end of spring 158 engages against the thumb-tab 154 to resiliently urge this thumb-tab (and retainer member 142) upwardly as viewed in FIG. 4.

In view of the above and with reference to FIG. 4, it can be seen that during assembly of the coupling 92, the spring 150 and plunger 152 are received into and are held entirely into the bore 148. Next, retainer member 142 is then slid laterally into grooves 140 so that the portion 142b of the retainer member passes over bore 148 and the head portion 1152d of this plunger member is received into and extends partially outwardly through the aperture 144 at recess 146. In order for the head portion 152d of the plunger member 152 to extend outwardly via aperture 144, the retainer member 142 must be moved along grooves 140 in the direction of the arrow on thumb-tab 154 so that the aperture 144 is beyond alignment with bore 96. The retainer member 142 is then allowed to return under the bias of spring 158 into a position of alignment at aperture 144 with bore 96, viewing FIG. 4c. This position of the retainer member 142 is its first position. This first position for retainer member 142 is seen in FIGS. 4b and 4c. Stated again, in this first position of the retainer member 142 relative to the body 94, the portion 152b of plunger member 152 is received into recess portion 146b, and holds the retainer member 142 with aperture 144 in alignment with bore 96.

In this first position of the retainer member 142, the portion 126a of an adapter 100 may be inserted into bore 96. As the groove 132 comes into alignment with retainer member 142, viewing FIGS. 4d and 4e, the head portion 152d of the plunger member 152 is engaged by shoulder 128, and is pushed inwardly, releasing the latching of retainer member 142 from its first position. Thus, this retainer member 142 is released by plunger 152 to be moved by spring 158 to a second position in which the portions 144a are received in the groove 132, and the adapter member 100 is thus latched into engagement with a coupling assembly 92, viewing FIG. 4d.

Understandably, release of the adapter 100 from the coupling assembly 92 requires only that the thumb-tab 154 be pressed slightly downwardly as is indicated by the arrow on this thumb tab in FIG. 4a. This downward movement of the retainer member 142 will release the portion 144a from the coupling assembly 92, and will also allow the plunger member 152 to latch the retainer member 142 again in its first position, as is seen in FIG. 4b. Because of the presence of the portion 126a of an adapter 100 in the bore 96, the retainer member 142 is not able to move far enough in the direction of the arrow on tab 154 to result in the plunger 152 being released from bore 148. It will be understood that other designs of quick-disconnect couplings may be used to interface the adapters 100 with the intermediate hoses 90.

An Example of the Use of Machine 24

Figure 5:
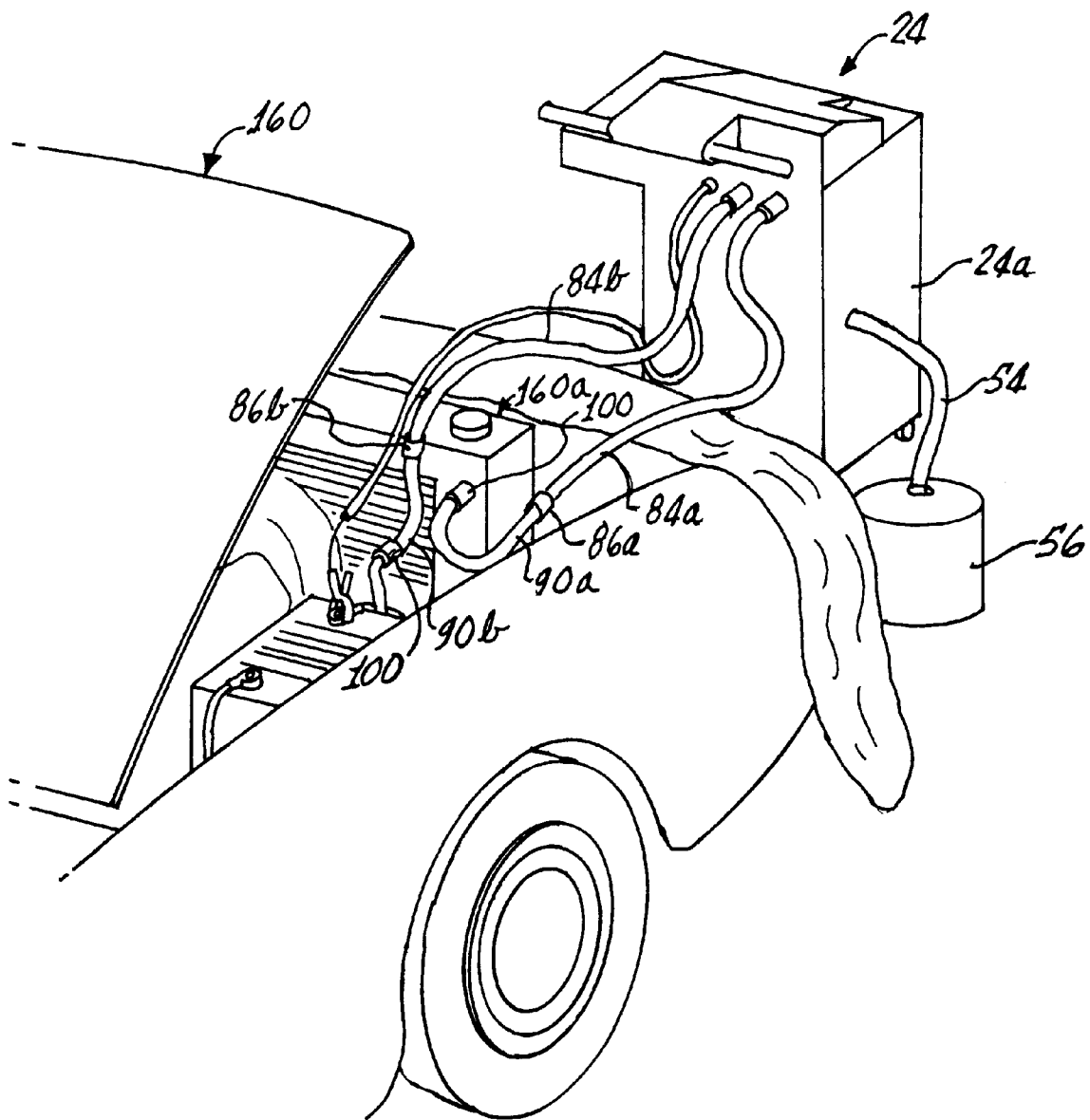

Viewing now FIG. 5, an example is pictorially presented showing the under-hood area of the an exemplary vehicle 160 having an automatic transmission cooler connection into an end tank of the vehicle's radiator, which is indicated with arrowed numeral 160a. Also shown is the use of a pair of the adapter fittings 100 to interconnect the machine 24 with this vehicle. In this case, the service technician has selected adapter fittings 100g and 100j (FIGS. 3g and 3j, respectively) which are complementary to one another, and also to the existing fittings for the transmission cooler connection 160a of this particular vehicle. The service technician has disconnected the two parts of the connection 160a from one another (as is seen in FIG. 5), and has then connected the adapters 100g and 100j to the fittings of the vehicle 160. It will be noted that while connecting the adapters 100 within the confines of the under-hood area of the vehicle 160, the service technician has only to deal with the relatively small and easily handled pair of complementary adapters. Thus, a greater convenience and additional room for hands is provided by the small size of these adapters in the frequently-cramped working area available for the connection of machine 24 to the vehicle 160.

In order to interconnect the two selected ones of the intermediate hoses 90a–d, the technician selects the pair of these intermediate hoses giving best access to the particular vehicle, and connects these intermediate hoses to the hoses 84a and 84b at couplings 86a and 86b. Thus, a configuration of hoses is created which will substantially form the conduits 28 and 38 (recalling the description above). Those ordinarily skilled in the pertinent arts will recognize that the selection of the most appropriate two of the four intermediate hoses is within the judgment of the service technician, and that many vehicles present the possibility that other combinations of the intermediate hoses and adapter fittings will be used to agree with the particular needs and preferences of the vehicles and of the personal choices of the technicians servicing these vehicles. For example, a technician who is left-handed may choose a different place of access to a vehicle than a technician who is right-handed, and may accordingly use a different combination of intermediate hoses and adapters. In this case, the service technician has chosen to connect the pair of hoses 90a and 90b, each with a straight or in-line shape of end portion, as was seen in FIG. 4. Again, another different technician may have chosen the intermediate hoses 90c and 90d for use on this same vehicle. The intermediate hoses are coupled to the adapters 100.

As is described, the engine of the vehicle 160 will be operated, and as a result transmission fluid will flow from the transmission via conduit 18, to the machine 24 via hose 84a, through the machine 24, back to the transmission cooler 16 via hose 84b, and then back to the transmission via a conduit 20 (which is not visible in FIG. 2). Other possible connections to the conduits 18 and 20 are possible. Some technicians may choose to connect into the external fluid circulation loop 22 at places adjacent to the transmission itself (e.g., this may be the case when the technician chooses to service the automobile 160 while it is on a lift—making access to the underside of the vehicle most convenient). Thus, after the machine 24 is interconnected with the transmission, the service of this transmission is carried out as outlined above and as further explained below.

Preferably, the transmission will already be at operating temperature, or is brought to operating temperature. The transmission is next operated for about 20 minutes while circulating a cleaning material in the transmission fluid. This may be accomplished on a chassis roller stand allowing the vehicle drive wheels to rotate as the technician shifts through various gears to insure that the cleaning material in the transmission ATF is circulated through all parts and mechanisms of the transmission. During this process, transmission fluid will circulate both in internal loop 22 (which is opened by attachment of machine 24 at connection 160a) and in external fluid circulation loop 26. As soon as this cleaning process is completed, the technician initiates withdrawal of the old transmission fluid and addition of new fluid by starting pump 64, providing the necessary operator input at control 82, observing the outflow rate at flow meter 30, and matching the inflow rate at meter 74 by manipulation of control valve 72.

Again, the transmission is operated in different gears to insure that the old fluid is removed from the various mechanisms of the transmission, including the torque converter. As was pointed out above, over 94 percent of the old transmission fluid will be replaced by new fluid in this way. The technician may observe the color and turbidity of fluid entering the waste container 56 in order to assess when a sufficient quantity of the old fluid has been displaced by new fluid. As the old fluid is discharged from the transmission, dirt, contaminants, wear particles, varnishes, and sludge removed from the mechanism of the transmission by the present cleaner will also be carried to waste container 56.

A particular advantage of the present invention results from the small number of hoses 84a and 84b, the small number of intermediate hoses 90a–90d, and the small, easily handled complementary pairs of adapters 100 which can be used, and which allow the machine 24 to be used to service the transmission of a wide variety of vehicles. In comparison with the conventional transmission machines using a plurality of hoses, many having permanently secured adapters and fittings (some conventional machines require as many as 20 to 30 hoses, or more), the present service machine 24 in comparison reduces initial investment, saves storage space, reduces maintenance requirements for the machine, and allows a simplified and much more convenient and flexible connection of the machine 24 to a wide variety of vehicles. In other words, rather than having to determine or figure out how to use the correct ones of 20 or more hoses and adapters conventionally utilized, a technician using the present transmission service machine need only select and use two of four intermediate hoses, and the appropriate two of the complementary pairs of adapters 100.

While the present invention has been depicted, described, and is defined by reference to a single particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A machine for service of an automatic transmission while the transmission is in an automotive vehicle, and which vehicle has an external circulation loop for circulation of transmission fluid external to the transmission, the external circulation loop having a vehicle coupling therein with two complementary parts coupled in fluid flow connection with one another to complete the external circulation loop, said machine being effective for use in interrupting the external circulation loop at the vehicle coupling where these complementary coupling parts are disconnected from one another, and to effect exchange of used transmission fluid from the transmission which used transmission fluid is received by said machine via one of the two complementary parts of the vehicle coupling and is replaced with new fluid supplied by said machine from a supply of new transmission fluid via the other of the two complementary parts of the vehicle coupling, said machine comprising:

a first fluid flow conduit adapted for connection to one of the complementary parts of the vehicle coupling and conducting used transmission fluid from the transmission to a waste container while the complementary parts of the vehicle coupling are uncoupled from one another, and a second fluid flow conduit adapted for connection to the other of the complementary parts of the vehicle coupling and conducting new transmission fluid from a source thereof into the transmission while the complementary parts of the vehicle coupling are uncoupled from one another;

said first fluid flow conduit and said second fluid flow conduit each including a respective one of a pair of elongate primary hoses, each one of said pair of primary hoses including at a distal end thereof a respective one of a pair of substantially identical first-disconnect coupling portions;

said first fluid flow conduit and said second fluid flow conduit each also including a respective one of an intermediate pair of hoses each one including at a proximal end thereof one of a respective pair of substantially identical second quick-disconnect coupling portions complementary to and interconnected with one of said pair of first quick-connect coupling portions, and at a distal end thereof each one of said intermediate pair of hoses having a respective one of a pair of substantially identical additional quick-disconnect coupling portions; and a pair of adapters each one having a substantially identical first end portion complementary to and sealingly engaged with one of said pair of additional quick-disconnect coupling portions, and a second end portion providing one of a pair of complementary termination features; which complementary termination features are adapted to be complementary to one another and are also adapted to be complementary each to a respective one of the one part and the other part of the vehicle coupling;

whereby said pair of adapters from a fluid flow connection both between said first conduit and said second conduit and also between opposite sides of the external fluid circulation loop of the transmission at disconnected parts of the vehicle coupling.

2. The machine of claim 1 wherein said machine includes four intermediate hoses each having a length, and any two of which may be selected to make said intermediate pair of hoses, said four intermediate hoses including a first pair of intermediate hoses each of which has said additional quick-disconnect coupling portion arranged in alignment with the length of said respective intermediate hose, and another pair of intermediate hoses each of which has a selected one of said second quick disconnect coupling portion and said additional quick-disconnect coupling portion arranged substantially perpendicularly to the length dimension of said respective intermediate hose.

3. The machine of claim 1 wherein said second end portions of said pair of adapters are complementary to one another.

4. The machine of claim 1 further including a set of plural adapters from which said pair of adapters is selected, said set of plural adapters including plural pairs of complementary adapters, each pair of which provides a differing complementary pair of second end portions.

5. A transmission cleaning machine for servicing an automotive automatic transmission while the transmission is in an automotive vehicle, and which automatic transmission and automotive vehicle includes an external transmission fluid circulation loop including a vehicle coupling with two complementary parts in fluid flow communication with one another, said transmission cleaning machine comprising:

a container for holding a supply of new automatic transmission fluid;

a first conduit and a second conduit for respectively receiving old automatic transmission fluid from the transmission and for delivering new automatic transmission fluid to the transmission via disconnected complementary parts of the vehicle coupling;

a pump receiving new automatic fluid from said container and supplying the new automatic transmission fluid pressurized via said second conduit to the external automatic transmission fluid circulation loop;

said machine further including a set of adapters adapted to be connected respectively with said first and said second conduits in fluid flow connection with the external fluid circulation loop at respective disconnected parts of the vehicle coupling, said set of adapters including plural pairs of adapters in which the individual adapters of each pair are complementary to one another, and one pair of said plural pairs of adapters is also complementary to and is adapted to be connected in fluid flow connection with the two complementary vehicle coupling parts;

whereby, the two complementary parts of the vehicle coupling are disengaged from one another to open the external fluid circulation loop, and said one pair of adapters is selected from among said plural pairs of adapters and is utilized to interconnect with the two parts of the vehicle coupling so that each individual adapter of the one pair of adapters connects one of said first conduit and said second conduit with a respective one of the two vehicle coupling parts.

6. The machine of claim 5 wherein said machine includes four intermediate hoses each having a length dimension, and any two of which may be selected to make said intermediate pair of hoses, said four intermediate hoses including a first pair of intermediate hoses each of which has said additional quick-disconnect coupling portion arranged in alignment with the length dimension of said respective intermediate hose, and another pair of intermediate hoses each of which has said additional quick-disconnect coupling portion arranged substantially perpendicularly to the length dimension of said respective intermediate hose.

7. A method of changing old transmission fluid out of an automotive automatic transmission on an exchange basis for new fluid simultaneously introduced to the transmission as old fluid is discharged therefrom while the transmission is installed in an automotive vehicle, the automatic transmission having an external fluid circulation loop including a vehicle coupling with two complementary parts in fluid flow connection with one another, said method comprising steps of:

providing a machine having a conduit for conducting automatic transmission fluid from the external circulation loop to a waste receptacle;

providing a supply of new transmission fluid;

providing a pair of elongate primary hoses, opening the fluid circulation loop at the vehicle coupling by disconnecting the two complementary parts of the vehicle coupling, and connecting a respective one of said primary hoses each to a respective one side of the opened fluid circulation loop each at a respective disconnected one of the two complementary parts of the vehicle coupling;

defining a respective portion of said first conduit and of said conduit each at respective distal ends thereof by use of a respective pair of substantially identical first quick-disconnected coupling portions;

providing an intermediate pair of hoses each one including at a proximal end thereof one of a pair of substantially identical second quick-disconnect coupling portions complementary to said first quick-disconnect coupling portions and connecting in fluid flow connection with said first quick-disconnect coupling portions, and at a distal end thereof each having a respective one of pair substantially identical additional quick-disconnect coupling portions; and supplying a pair of adapters each having a substantially identical first end portion complementary to and sealingly engaged with one of said pair of additional quick-disconnect coupling portions, and also having a second end portion adapted to provide a termination feature complementary to and connecting in fluid flow connection to a respective one of the disconnected parts of the vehicle coupling of the external fluid circulation loop of the vehicle.

8. The method of claim 7 further including the step of:

providing a set of adapters each for use with differing vehicles for connecting the machine at said first and said second conduits in fluid flow communication with external fluid circulation loops of the respective vehicles at respective parts of a coupling thereof, said set of adapters including plural pairs of adapters in which the individual adapters of each pair are complementary to one another.

9. The method of claim 8 including the step of providing one pair of adapters which at said end termination portion is complementary to a hose.

10. The method of claim 8 including the step of providing one pair of adapters at said end termination portion is complementary to a pipe thread.

11. The method of claim 8 including the step of providing one pair of adapters at said end termination portion is complementary to a flare tube fitting.

12. The method of claim 8 including the step of providing one pair of adapters at said end termination portion is complementary to an O-ring fitting.

13. The method of claim 8 including the step of providing one pair of adapters at said end termination portion is complementary to a reversed flare tube fitting.

14. In combination, a machine for service of an automatic transmission in an automotive vehicle, which vehicle has an external circulation loop for transmission fluid, the loop having a vehicle coupling therein with two complementary parts connecting in fluid flow connection, and a set of plural pairs of adapters for interfacing said machine with each of the two complementary parts of the vehicle coupling when the parts of the vehicle coupling are disconnected from one another; said machine and a selected one pair of said plural pairs of adapters being affective for use in interrupting the external fluid flow loop by disconnection of the complementary adapters of the selected one pair of adapters, and to effect exchange of used transmission fluid from the transmission with new fluid from a supply thereof, said machine comprising:

a first fluid flow conduit for conducting used transmission fluid from the transmission via one of the complementary parts of the vehicle coupling and one of the selected one pair of adapters to a waste container, and a second fluid flow conduit for conduit for conducting new transmission fluid from a source thereof via the other of the complementary parts of the vehicle coupling and the other of the selected one pair of adapters into the transmission;

a pair of elongate primary hoses, each one of said pair of primary hoses defining a portion of a respective one of said first conduit and of said second conduit, each one of said pair of primary hoses including at a distal end thereof a respective one of a pair of substantially identical fir quick-disconnect coupling portions;

an intermediate pair of hoses, each one of said intermediate pair of hoses including at a proximal end thereof one of a respective pair of substantially identical second quick-disconnect coupling portions complementary to said first quick-disconnect coupling portions, and at a distal end thereof each one of said intermediate pair of hoses having a respective one of a pair of substantially identical additional quick-disconnect coupling portions; and said plural pairs of adapters each having a substantially identical first end portion complementary to and sealingly engageable with one of said pair of additional quick-disconnect coupling portions, and a second end portion adapted to be complementary both to each other and also each being adapted to be complementary to and connecting in fluid flow connection to one part of the vehicle coupling.

15. The combination of claim 14 wherein one pair of said plural pairs of adapters includes end termination portions which are complementary to a hose.

16. The combination of claim 14 wherein one pair of said plural pairs of adapters includes end termination portions which are complementary to a pipe thread.

17. The combination of claim 14 wherein one pair of said plural pairs of adapters includes end termination portions which are complementary to a flare tube fitting.

18. The combination of claim 14 wherein one pair of said plural pairs of adapters includes end termination portions which are complementary to an O-ring fitting.

19. The combination of claim 14 wherein one pair of said plural pairs of adapters includes end termination portions which are complementary to a reversed flare tube fitting.

20. A set of adapters for use to connect a transmission service machine and any one of a multitude of differing vehicles each having an automatic transmission to be serviced by use of the machine, the one vehicle having a fluid circulation loop in which transmission fluid flows during operation of the vehicle, and the fluid circulation loop including at least one vehicle coupling, each at least one vehicle coupling including two complementary vehicle coupling parts; and set of adapters comprising:

plural pairs of adapters, each adapter part of a pair being adapted for connecting the transmission service machine in fluid flow connection with respective complementary parts of a vehicle coupling when the two complementary parts of the vehicle coupling are disconnected from one anther; each pair of said plural pairs of adapters including two adapter parts, each adapter part at a respective first end termination portion being complementary to the other adapter part of the pair and to one part of the disconnected vehicle coupling, and each adapter part of also including a second and termination portion, which second end termination portion is substantially similar to respective individual second end termination portions of each adapter part of said plural pairs of adapters, and said second end termination portion being configured to connect in fluid flow connection with a quick-disconnect coupling.

\* \* \* \* \*